Feb. 3, 1959 L. M. FOSTER 2,871,555

METHOD OF JACKETING FISSIONABLE MATERIALS

Filed March 4, 1947

INVENTOR.
Luther M. Foster
BY
Robert A. Lacombe
Attorney

United States Patent Office 2,871,555
Patented Feb. 3, 1959

2,871,555
METHOD OF JACKETING FISSIONABLE MATERIALS

Luther M. Foster, Providence, R. I., assignor to the United States of America as represented by the United States Atomic Energy Commission Application March 4, 1947, Serial No. 732,342

5 Claims. (Cl. 29—474.3)

This invention relates to an improved method of jacketing fissionable material. More specifically, the invention relates to an improvement in the jacketing of fissionable materials, such as uranium, to prevent escape of fissionable material from the jacket and to prevent corrosion of the fissionable material when used in a neutronic reactor.

In neutronic reactors, the fissionable material, such as uranium, is commonly enclosed in a jacket of a material of low neutron absorption and high thermal conductivity, such as aluminum. The aluminum jacket is commonly bonded to the fissionable member by, for example, a zinc-aluminum alloy, in order to provide efficient heat transfer from the fissionable member to the jacket and thus to the external coolant. The fissionable members and the jackets surrounding them are commonly cylindrical in shape. In making such a structure, the aluminum jacket is commonly fabricated in two pieces, an elongated cup and a cap adapted to close the end thereof. The cylindrical fissionable member, commonly uranium, is inserted into the elongated cup and bonded thereto by the thin bonding layer. The materials and methods for preforming such a bonding operation are not in themselves any portion of this invention, being the inventions of other inventors.

After the bonding of the uranium member to the interior surface of the aluminum container, the cap, commonly in the form of a plug, is inserted into the open end of the elongated cup and welded thereto around the circular edge, thus completing the unitary cylindrical structure. It may be found that the weld described above is prone to be weak and to develop faults and imperfections which permit leakage between the exterior and the interior of the jacket. This difficulty is particularly aggravated when the jacket is extremely thin, as may be required in neutronic reactors wherein the loss of neutrons due to factors other than the jacket material is sufficiently great so as to bring the neutron reproduction factor extremely close to unity. As is well known, a one-to-one ratio between the neutrons produced by fission of the fissionable material and the neutrons producing further fissions is necessary in order to sustain the reaction. Since the jacket material inevitably absorbs a certain proportion of the neutrons passing through it, which proportion increases with the thickness of the jacket material, some designs of neutronic reactors require extreme thinness of the aluminum jackets surrounding the fissionable member of uranium.

It is the principal object of the present invention to provide a method of maximizing the effectiveness of the welded closure made after bonding a fissionable material into a jacket.

It is a further object of the invention to provide a method whereby aluminum surfaces which must subsequently be welded may be prevented from interacting with the bonding material so as to impair the effectiveness of the subsequent weld.

It is a further object of the invention to provide a method whereby aluminum surfaces exposed to molten bonding materials may be prevented from interacting therewith.

Generally, the objects of this invention are accomplished by electroplating upon that portion of the aluminum jacket to be protected from the bonding material, a material, such as chromium, which is impermeable to the bonding material. After the bonding operation the electroplate is removed and the aluminum surface, unimpaired, may be welded to the cap which effects the closure.

For details of construction and operation of neutronic reactors, which utilize but form no part of the present invention, reference is made to Fermi et al. Patent 2,708,656, dated May 17, 1955.

For better understanding of the invention, reference is made to the drawing, in which.

Figure 1:
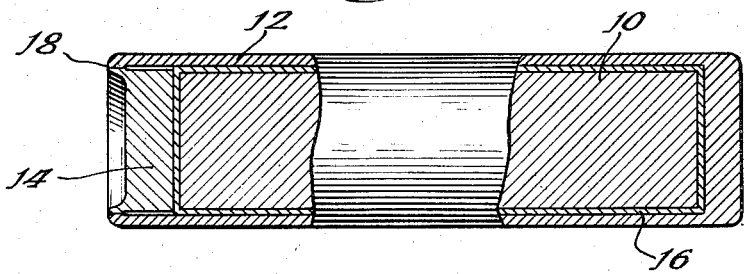
Fig. 1 is a longitudinal sectional view, partially in elevation, of a cylindrical jacketed uranium member made in accordance with the teachings of the invention.
Figure 3:
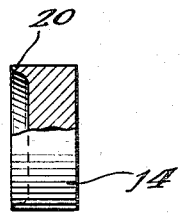
Fig. 3 is a side elevational view, partially in section, of the plug cap which effects closure of the member of Fig. 1.

Referring first to Fig. 1, a cylinder 10 of fissionable material, for example uranium, is enclosed in a close-fitting jacket consisting of an elongated aluminum cup 12 and an aluminum plug cap 14. The member 10 is bonded to the cup 12 by a bonding layer 16 of a material such as zinc-aluminum alloy. It will be understood that in the illustration of the drawing the thickness of the bonding layer 16 is exaggerated for clarity. The bonding operation is performed before insertion of the cap 14. The cap 14 is inserted thereafter and a weld 18 is made around the seam between the cap 14 and the cup 12. As may be seen in Fig. 3, the cap 14 is in the form of a disc having a peripheral lip or flange 20 to facilitate the making of the weld 18.

Figure 2:
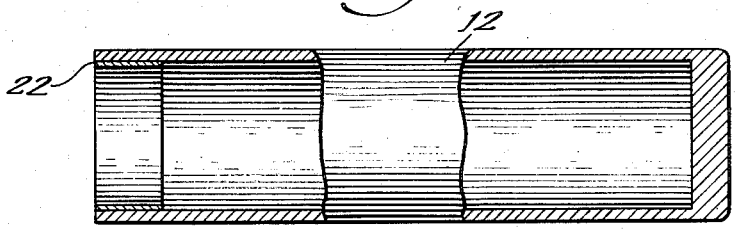
Fig. 2 is a longitudinal sectional view of the elongated cup which constitutes a portion of the member of Fig. 1, illustrating the method of treatment which constitutes the present invention.

The essence of the present invention is illustrated in Fig. 2, which shows the cup 12 prior to insertion of the fissionable member 10 and the bonding thereof to the cup 12. The outer portion of the inner surface of the cup 12 has plated thereon as by electroplating an annular ring 22, for example of chromium. The chromium plate 22, exaggerated in thickness in the drawing, is completely impervious to the action of a bonding material, such as a zinc alloy. In the absence of such a plate 22, it is found that the molten bonding material, such as a zinc alloy, attacks the thin cup 12 at the outer end in such a manner as to impair the subsequent weld. It is believed that this deleterious effect results from alloying of the zinc contained in the bonding material with the aluminum of the cup 12. In the present invention this undesirable effect is prevented. The chromium plate 22 is preferably removed, for example by nitric acid, after the fissionable member 10 is bonded within the cup 12. In this manner, the aluminum at the outer edge of the cup 12 is left unaffected by the exposure to the molten bonding material and the quality of the weld 18 is greatly improved.

It will be understood that the teachings of this invention are not limited to the exact embodiment disclosed in the drawing and described above. Persons skilled in the art will readily adapt the teachings of this invention to methods of treatment and fabrication other than that specifically described herein.

What is claimed is:

1. In a process including the steps of bonding a body of metal to the interior surface of a metal container and thereafter welding a closure member over the open end of the container, the steps of electroplating onto the internal surface of the container adjacent the open end a metal which is impervious to the bonding material before the bonding operation, and chemically removing said electroplate before the welding operation.

2. The method of claim 1 wherein the metal body is uranium, the metal container is of aluminum, and the bonding material is a zinc alloy.

3. A method of jacketing a metal body, comprising electroplating part of an interior surface of the open end of a cylindrical metal container with a corrosion-resistant metal, applying a molten metal bond over the rest of the interior of the container, inserting a metal body into the container, chemically removing the electroplate, and welding a closure to the surface over the open end.

4. A method of jacketing a metal body comprising electroplating part of an interior surface of the open end of a cylindrical metal container with a corrosion-resistant metal, applying a molten zinc alloy bond over the rest of the interior of the container, inserting a metal body into the container, removing the electroplate by an acid, and welding a closure to the surface over the open end.

5. A method of jacketing a metal body, comprising electroplating part of an interior surface of the open end of a cylindrical aluminum container with chromium, applying molten zinc alloy bond over the rest of the interior of the container, inserting a uranium cylinder into the container, removing the chromium by nitric acid, and welding a closure to the surface over the open end.

References Cited in the file of this patent

UNITED STATES PATENTS

| | | |
|---|---|---|
| 2,323,160 | Stecher et al. | June 29, 1943 |
| 2,342,357 | Miller | Feb. 22, 1944 |
| 2,473,887 | Jennings et al. | June 21, 1947 |